(12) United States Patent
Groening

(10) Patent No.: US 7,671,496 B2
(45) Date of Patent: Mar. 2, 2010

(54) DIRECT DRIVE

(75) Inventor: Ingolf Groening, Lohr am Main (DE)

(73) Assignee: Robert Bosch GmbH, Stuttgart (DE)

( * ) Notice: Subject to any disclaimer, the term of this patent is extended or adjusted under 35 U.S.C. 154(b) by 189 days.

(21) Appl. No.: 11/835,649

(22) Filed: Aug. 8, 2007

(65) Prior Publication Data

US 2008/0054767 A1 Mar. 6, 2008

(30) Foreign Application Priority Data

Aug. 30, 2006 (DE) .................. 10 2006 040 611

(51) Int. Cl.
*H02K 7/00* (2006.01)
(52) U.S. Cl. .................... 310/75 R; 310/162
(58) Field of Classification Search .......... 310/75 R, 310/162

See application file for complete search history.

(56) References Cited

U.S. PATENT DOCUMENTS

| 4,060,745 | A | * | 11/1977 | Linscott, Jr. | ........... 310/156.22 |
|---|---|---|---|---|---|
| 5,952,746 | A | * | 9/1999 | Mittmann et al. | ............. 310/42 |
| 6,247,407 | B1 | * | 6/2001 | Hartmann et al. | ........... 101/480 |
| 6,462,459 | B1 | * | 10/2002 | Kirkman | ..................... 310/273 |
| 7,394,177 | B2 | * | 7/2008 | Vogt et al. | ..................... 310/91 |
| 2002/0121819 | A1 | * | 9/2002 | Beatty et al. | ............... 310/67 R |
| 2003/0213087 | A1 | * | 11/2003 | Moein et al. | ................ 15/250.3 |

FOREIGN PATENT DOCUMENTS

DE          41 43 597        6/1998
JP          11103555 A   *  4/1999

* cited by examiner

*Primary Examiner*—Quyen Leung
*Assistant Examiner*—Naishadh N Desai
(74) *Attorney, Agent, or Firm*—Michael J. Striker

(57) ABSTRACT

A direct drive without bearings for coupling to a shaft has a housing having a first end face composed of a connection flange with a central recess and a second end face composed of a removable cover diametrically opposed to the connecting flange, a rotor and a stator located coaxially with each other inside the housing, with the stator being fixedly connected with the housing, and locking elements via which the rotor is fixed inside the housing in position in a radial direction, and/or axial direction.

8 Claims, 1 Drawing Sheet

DIRECT DRIVE

CROSS-REFERENCE TO A RELATED APPLICATION

The invention described and claimed hereinbelow is also described in German Patent Application DE 10 2006 040 611.7 filed on Aug. 30, 2006. This German Patent Application, whose subject matter is incorporated here by reference, provides the basis for a claim of priority of invention under 35 U.S.C. 119(a)-(d).

BACKGROUND OF THE INVENTION

The present invention relates to a direct drive without bearings.

Patent DE 41 43 597 C2 shows a drive of the type used, e.g., in printing presses. Installation is relatively time-consuming and complicated due to the large number of individual parts used to install the drive on the machine housing and the machine shaft. A great deal of maintenance is also required, because all of these individual parts must be taken disassembled in order to remove or replace the drive. In addition, the bearing system used is subject to wear.

SUMMARY OF THE INVENTION

The object of the present invention is to provide a modular concept for a direct drive that makes it possible to securely install the drive without the use of bearings.

This object is attained by the present invention by using a direct drive for coupling to a shaft, particularly the shaft of a printing press; the drive includes a rotor and a stator; the rotor and stator are located coaxial with each other inside a housing; a first end face of the housing is composed of a connection flange with a central recess, and a second end face of the housing is composed of a removable cover diametrically opposed to the connection flange; the stator is fixedly connected with housing, and the connection flange, rotor, and cover in particular include locking elements, via which the rotor is fixable in position in the radial and/or axial direction inside the housing.

The advantage of this solution is obvious. The stator and rotor can be securely supported such that they are safeguarded against each other, e.g., during shipment, thereby preventing them from becoming damaged.

Preferably, projections that are coaxial with the rotor axis and stator axis and extend into the housing interior are located on the circumference of the central recess of the connection flange; projections that are coaxial with the rotor axis and the stator axis are also located on the end face of the rotor facing the connection flange; the projections on the connection flange and the rotor are formed such that the rotor and connection flange become preloaded against each other when the rotor is moved axially toward the connection flange using a push rod located on the cover, the preloading ensuring that the rotor and stator are centered relative to each other.

Since the rotor and the stator are always located coaxial with each other inside the housing with an even amount of clearance (air gap) between them, damage is prevented, particularly to the surfaces of the rotor and/or stator. The entire system can be installed from the B side (drive side) of the motor, while, on the A side (output side), only the housing is installed on a machine wall, using a flange. Bearings are not required, since the distance (air gap) between the stator and the rotor is automatically ensured. The inventive concept can also be used directly with motors with very long axial lengths and high tolerances.

Particularly preferably, the rotor includes clamp connectors, which enable it to be fixedly connected with a shaft to be driven. Preferably, these connectors fixedly clamp the rotor to the shaft along the entire length of the rotor, or at least on two diametrically opposed sides. It is also advantageous when the clamp connection is accessible preferably from the B side of the motor, which simplifies installation. The clamping securely prevents the rotor from wobbling, because the wobbling is caused by radially acting forces of the rotor caused, e.g., by permanent magnets installed on the rotor, or by production tolerances that have the effect of imbalance.

In addition, a sensor is preferably installed on the stator such that it is flexible in the axial direction and rigid in the radial direction. The sensor therefore remains centered and supported coaxially with the rotor and the stator, but it can continue to move axially.

Particularly preferably, the connection flange includes centering elements located coaxial with the stator and rotor on the installation side, which is diametrically opposed to the projections. The connection flange includes recesses for mounting on a support bearing. The centering elements help keep the air gap constant, with a desired radial width, while the direct drive is being installed. The recesses in the form of bore holes make it possible to easily mount the flange on the machine, e.g., using screws.

Advantageously, a machine with a shaft to be driven is equipped with a direct drive as recited in one of the preceding Claims; the rotor is clamped on the machine shaft, and the motor housing is mounted on the machine via the connection flange; the rotor is rotatable inside the stator using the shaft. The drive requires very little maintenance, and it can be installed or removed very easily and quickly due to the inventive concept. This has a positive effect on the costs of the machine.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
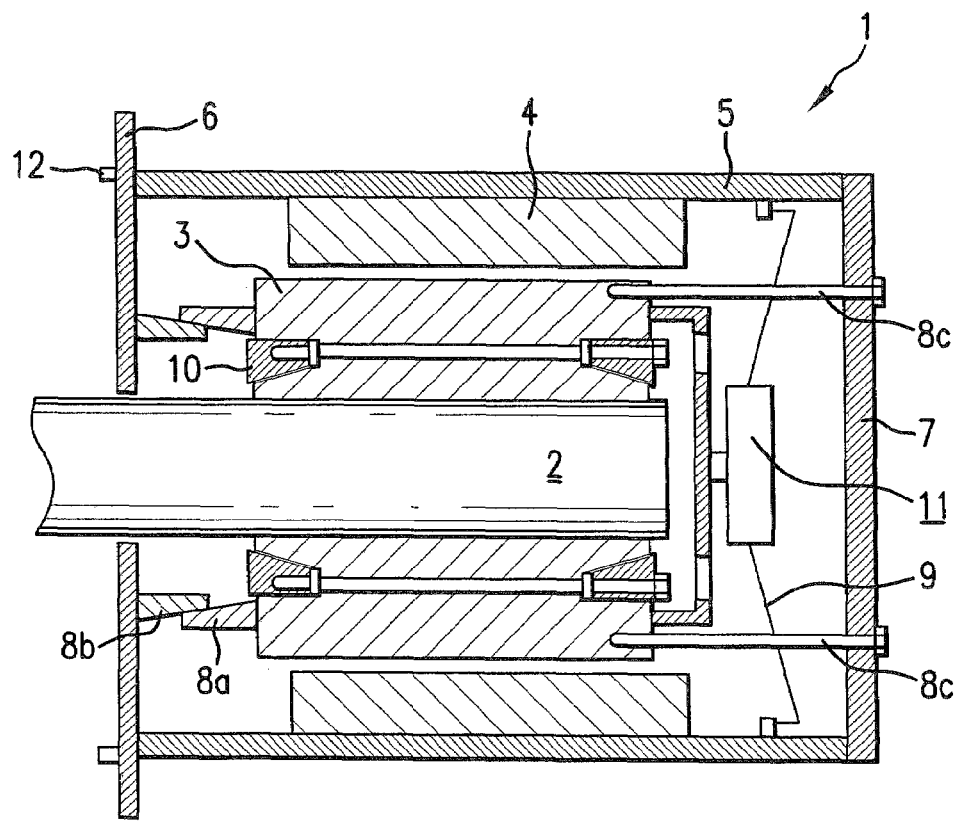
FIG. 1 is a view showing the machine in accordance with the present invention in the secured state.
Figure 2:
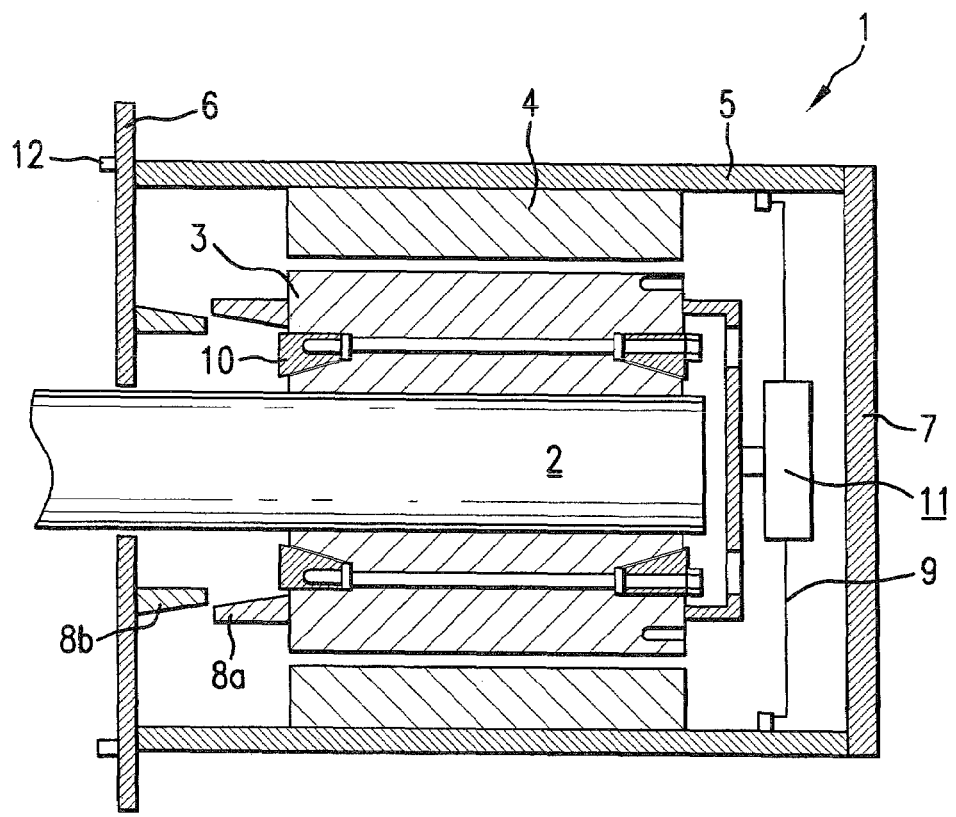
FIG. 2 is a view showing the machine in accordance with the present invention in the installed, non-secured state.

Inventive direct drive 1 shown in FIGS. 1 and 2 includes a rotor 3 and a stator 4; rotor 3 and stator 4 are located coaxial with each other inside a housing 5; the installation-side end face of housing 5 is composed of a connection flange 6 with a central recess, and the side diametrically opposed to the installation-side end face of housing 5 is composed of a removable cover 7.

Stator 4 is fixedly connected with housing 5. Connection flange 6, cover 7, and rotor 3 include locking elements 8*a,b,c* in the form of rotor-side projections 8*a*, flange-side projections 8*b*, and rod-shaped locking elements 8*c*, which extend between cover 7 and rotor 3. Rotor 3 is fixable in position in the radial and/or axial direction inside housing 5 using locking elements 8*c*. Flange-side projections 8*b* are located coaxial with the rotor axis and the stator axis, and they extend into the interior of housing 5.

Rotor 3 includes clamps 10, by way of which it is fixedly connectable with a shaft 2 to be driven. A sensor 11 is installed on stator 4 using a sensor coupling 9 such that it is flexible in the axial direction and rigid in the radial direction. Connection flange 6 includes—on the installation side diametrically opposed to projections 8b—centering elements (centering pins in this case) 12, which are located coaxial with the stator and the rotor. Connection flange 6 also includes recesses for mounting on a support bearing (e.g., bore holes).

A machine-side shaft 2 that is not a component of direct drive 1 is shown in FIGS. 1 and 2.

The difference between FIG. 1 and FIG. 2 is that, in FIG. 1, rotor 3 is also fixed in position via locking elements 8a,b,c inside housing 5 and coaxial with stator 4. FIG. 2, however, shows a rotor 3 that is already mounted on a shaft 2 and is capable of rotating freely.

The ease with which inventive direct drive 1 can be installed will be described below.

The motor does not require any bearings that ensure the presence of the air gap between rotor 3 and stator 4, because, in the uninstalled state, locking elements 8a,b,c ensure that correct support is provided. In the installed state, the support is automatically ensured due to the insertion of centering element 12 into corresponding recesses in a support bearing (e.g., the machine wall), and due to the location of rotor 3 on shaft 2 to be driven.

In the uninstalled state (FIG. 1, support, shipping), the distance between rotor 3 and stator 4 is realized on the A side (installation side) using projections 8a, b, which are preferably conical in design. Due to the coaxial positioning of projections 8a, b around the virtual axis of rotation of rotor 3, it is simultaneously ensured that rotor 3 is centered in stator 4. On the B side (drive side), the distance between rotor 3 and stator 4 is ensured via locking element 8c. It is a rod 8c, which is inserted from the outside through a bore hole in cover plate 7 into a recess in rotor 3 and makes possible an axial displacement of rotor 3 in the direction toward projections 8b when housing 5 is closed. Rotor 3 is therefore capable of being fixed in position in the axial and radial directions inside housing 5.

To install the direct drive, it is only necessary to slide housing 5—which encloses stator 4 and rotor 3—onto shaft 2 to be driven. Rotor 3, which is fixed in position inside housing 5, is slid onto shaft 2 via the central recess in flange 6 described above, while stator centering elements 12 simultaneously engage in the corresponding recesses on the machine side, so that stator 4 and rotor 3 are retained coaxially and with clearance. The entire system is guided automatically using centering elements 12 and shaft 2.

After B-side cover 7 is removed, the clamp—which is only accessible from the B side—is tightened, thereby clamping rotor 3 to shaft 2. Subsequently, housing 5 is displaced axially toward the support bearing and is screwed in place there. Stator 4 changes its position relative to rotor 3. While housing 5 approaches the machine in this manner, A-side projections 8a and 8b, which are adjoined in the manner of wedges, become separated, and rotor 3 clamped on shaft 2 can rotate freely. The dimensions of the entire system are chosen such that, after housing 5 is screwed onto the machine, rotor 3 is covered entirely by the active parts of stator 4 and is free to rotate, thereby ensuring the maximum torque.

Sensor coupling 9 is movable in the axial direction and fixes sensor 11 in position only in the radial direction. As a result, sensor 11, which is located on housing 5 and rotor 3, can also move axially with rotor 3. Disassembly takes place in the reverse order, i.e., loosen housing flange 6, fix rotor 3 in position radially by pulling stator 4 axially outward, loosen clamp connection 10 on rotor 3, and insert B-side locking element 8c into the bore holes in pre-installed cover 7; locking element 8c is also inserted into the bore holes in rotor 3 provided especially for this purpose. Locking elements 8c perform two functions. They serve to fix rotor 3 in position in the radial and axial directions inside housing 5, e.g., during shipment. They also make it easier to remove housing 5 by exerting axially-directed force onto rotor 3.

It will be understood that each of the elements described above, or two or more together, may also find a useful application in other types of constructions differing from the type described above.

While the invention has been illustrated and described as embodied in a direct drive, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A direct drive without bearings for coupling to a shaft, comprising:
   a housing having a first end face composed of a connection flange with a central recess and a second end face composed of a removable cover diametrically opposed to said connecting flange;
   a rotor and a stator located coaxially with each other inside said housing, such that said rotor and stator are fully embedded into said housing, said stator being fixedly connected with said housing; and
   locking elements disposed inside of said housing, wherein said locking elements comprise conical projections around the central recess and are coaxially positioned around a virtual axis of rotation of said rotor to engage front sides of said rotor, wherein said rotor is securable said locking elements inside said housing in position in a direction selected from the group consisting of a radial direction, an axial direction, and both.

2. A direct drive as defined in claim 1, wherein the direct drive without bearings is configured for coupling to a shaft of a printing press.

3. A direct drive as defined in claim 1, wherein said connection flange and said cover are provided with said locking elements.

4. A direct drive as defined in claim 1, wherein said locking elements include first projections extending into an interior of said housing and located coaxial with an axis of said rotor and an axis of said stator on a circumference of said central recess of said connection flange, and second projections located on an end face of said rotor facing said connection flange and coaxial with the axis of said rotor and the axis of said stator, said first projections being formed on said connection flange and said rotor such that said rotor and said connection flange become preloaded against each other by moving said rotor axially in a direction toward said connection flange using a push rod located on said cover, with the preloading ensuring that said rotor and said stator are centered to each other.

5. A direct drive as defined in claim 1, wherein said rotor includes clamp connectors for fixedly clamping said rotor with the shaft.

6. A direct drive as defined in claim 1; and further comprising a sensor installed on said stator such that it is flexible in an axial direction and rigid in a radial direction.

7. A direct drive as defined in claim 4, wherein said connection flange includes centering elements arranged on an installation side opposite to said second projections and coaxially with said stator and said rotor.

8. A direct drive as defined in claim 1, wherein said rotor is clampable on the shaft, said housing being mountable on a machine via said connecting flange, and said rotor being drivable inside said stator using the shaft.

* * * * *